US012753266B2

(12) United States Patent
Perez et al.

(10) Patent No.: US 12,753,266 B2
(45) Date of Patent: Oct. 6, 2026

(54) CURABLE COMPOSITION AND ABRASIVE ARTICLES MADE USING THE SAME

(71) Applicant: 3M INNOVATIVE PROPERTIES COMPANY, St. Paul, MN (US)

(72) Inventors: Mario A. Perez, Burnsville, MN (US); Binhong Lin, Woodbury, MN (US); Jaime A. Martinez, Kissimmee, FL (US)

(73) Assignee: 3M Innovative Properties Company, St. Paul, MN (US)

( * ) Notice: Subject to any disclaimer, the term of this patent is extended or adjusted under 35 U.S.C. 154(b) by 603 days.

(21) Appl. No.: 18/036,229

(22) PCT Filed: Nov. 4, 2021

(86) PCT No.: PCT/IB2021/060220

§ 371 (c)(1),
(2) Date: May 10, 2023

(87) PCT Pub. No.: WO2022/101746

PCT Pub. Date: May 19, 2022

(65) Prior Publication Data

US 2023/0416445 A1 Dec. 28, 2023

Related U.S. Application Data

(60) Provisional application No. 63/112,898, filed on Nov. 12, 2020.

(51) Int. Cl.

*C08G 18/10* (2006.01)
*B24B 37/22* (2012.01)

(Continued)

(52) U.S. Cl.

CPC .............. *C08G 18/10* (2013.01); *B24B 37/22* (2013.01); *B24B 37/245* (2013.01); *C08G 18/222* (2013.01); *C08K 3/013* (2018.01)

(58) Field of Classification Search

None

See application file for complete search history.

(56) References Cited

U.S. PATENT DOCUMENTS

| | | | |
|---|---|---|---|
| 2,958,593 | A | 11/1960 | Hoover et al. |
| 4,227,350 | A | 10/1980 | Fitzer |

(Continued)

FOREIGN PATENT DOCUMENTS

| | | | |
|---|---|---|---|
| CA | 2839757 | C | 1/2021 |
| GB | 765500 | A | 1/1957 |

(Continued)

OTHER PUBLICATIONS

International Search Report for PCT International Application No. PCT/IB2021/060220, mailed on Feb. 11, 2022, 3 pages.

*Primary Examiner* — Catherine S Branch

(74) *Attorney, Agent, or Firm* — Ann Benjamin

(57) ABSTRACT

A curable composition comprises at least one cyclic olefin capable of undergoing ring opening metathesis polymerization; at least one ring opening metathesis polymerization catalyst or precursor catalyst thereof; abrasive particles having surface hydroxyl groups; and a difunctional coupling agent represented by the structure Z-X-Z (I). Each Z independently represents a group that is chemically reactive with at least one of the surface hydroxyl groups of one of the abrasive particles thereby forming at least one covalent bond. X represents a divalent organic linking group have a number average molecular weight of 500 to 10000 grams per mole.

19 Claims, 1 Drawing Sheet

(51) Int. Cl.

| | |
|---|---|
| ***B24B 37/24*** | (2012.01) |
| ***C08G 18/22*** | (2006.01) |
| ***C08K 3/013*** | (2018.01) |

(56) References Cited

U.S. PATENT DOCUMENTS

| | | | |
|---|---|---|---|
| 4,314,827 | A | 2/1982 | Leitheiser et al. |
| 4,400,340 | A | 8/1983 | Klosiewicz |
| 4,588,419 | A | 5/1986 | Caul et al. |
| 4,652,275 | A | 3/1987 | Bloecher et al. |
| 4,734,104 | A | 3/1988 | Broberg |
| 4,737,163 | A | 4/1988 | Larkey |
| 4,751,138 | A | 6/1988 | Tumey et al. |
| 4,751,337 | A | 6/1988 | Espy et al. |
| 4,799,939 | A | 1/1989 | Bloecher et al. |
| 4,800,685 | A | 1/1989 | Haynes, Jr. |
| 4,991,362 | A | 2/1991 | Heyer et al. |
| 5,152,917 | A | 10/1992 | Pieper et al. |
| 5,198,511 | A | 3/1993 | Brown-Wensley et al. |
| 5,201,916 | A | 4/1993 | Berg et al. |
| 5,203,884 | A | 4/1993 | Buchanan et al. |
| 5,213,591 | A | 5/1993 | Celikkaya et al. |
| 5,366,523 | A | 11/1994 | Rowenhorst et al. |
| 5,378,251 | A | 1/1995 | Culler et al. |
| 5,435,816 | A | 7/1995 | Spurgeon et al. |
| 5,436,063 | A | 7/1995 | Follett et al. |
| 5,480,940 | A * | 1/1996 | Khasat .................. C08F 285/00 525/289 |
| 5,496,386 | A | 3/1996 | Broberg et al. |
| 5,520,711 | A | 5/1996 | Helmin |
| 5,591,239 | A | 1/1997 | Larson et al. |
| 5,609,706 | A | 3/1997 | Benedict et al. |
| RE35,570 | E | 7/1997 | Rowenhorst et al. |
| 5,672,097 | A | 9/1997 | Hoopman |
| 5,681,361 | A | 10/1997 | Sanders, Jr. |
| 5,712,210 | A | 1/1998 | Windisch et al. |
| 5,849,851 | A | 12/1998 | Grubbs et al. |
| 5,858,140 | A | 1/1999 | Berger et al. |
| 5,928,070 | A | 7/1999 | Lux |
| 5,946,991 | A | 9/1999 | Hoopman |
| 5,961,674 | A | 10/1999 | Gagliardi et al. |
| 5,975,987 | A | 11/1999 | Hoopman et al. |
| 5,975,988 | A | 11/1999 | Christianson |
| 5,984,988 | A | 11/1999 | Berg et al. |
| 6,017,831 | A | 1/2000 | Beardsley et al. |
| 6,129,540 | A | 10/2000 | Hoopman et al. |
| 6,521,004 | B1 | 2/2003 | Culler et al. |
| 6,525,125 | B1 | 2/2003 | Giardello et al. |
| 6,649,146 | B2 | 11/2003 | Angeletakis et al. |
| 6,800,170 | B2 | 10/2004 | Kendall et al. |
| 6,881,483 | B2 | 4/2005 | Mcardle et al. |
| 8,142,531 | B2 | 3/2012 | Adefris et al. |
| 8,142,532 | B2 | 3/2012 | Erickson et al. |
| 8,142,891 | B2 | 3/2012 | Culler et al. |
| 9,180,573 | B2 | 11/2015 | Givot et al. |
| 9,370,876 | B2 | 6/2016 | Rule et al. |
| 2002/0015519 | A1 | 2/2002 | Tokas et al. |
| 2007/0037940 | A1 | 2/2007 | Lazzari et al. |
| 2009/0165394 | A1 | 7/2009 | Culler et al. |
| 2009/0169816 | A1 | 7/2009 | Erickson et al. |
| 2012/0227333 | A1 | 9/2012 | Adefris et al. |
| 2013/0040537 | A1 | 2/2013 | Schwabel et al. |
| 2013/0125477 | A1 | 5/2013 | Adefris |
| 2015/0152283 | A1 | 6/2015 | Stephen et al. |

FOREIGN PATENT DOCUMENTS

| | | | |
|---|---|---|---|
| JP | 2014051588 | A | 3/2014 |
| WO | 2009154849 | A1 | 12/2009 |
| WO | 2014209567 | A1 | 12/2014 |
| WO | 2017062482 | A1 | 4/2017 |
| WO | 2017192426 | A1 | 11/2017 |
| WO | 2019239267 | A1 | 12/2019 |
| WO | 2021074734 | A1 | 4/2021 |
| WO | 2021074749 | A1 | 4/2021 |
| WO | 2021124043 | A1 | 6/2021 |
| WO | 2021124156 | A1 | 6/2021 |
| WO | 2021202485 | A1 | 10/2021 |
| WO | 2021255580 | A1 | 12/2021 |
| WO | 2022219427 | A1 | 10/2022 |

* cited by examiner

CURABLE COMPOSITION AND ABRASIVE ARTICLES MADE USING THE SAME

CROSS REFERENCE TO RELATED APPLICATIONS

This application is a national stage filing under 35 U.S.C. § 371 of PCT/IB2021/060220, filed Nov. 4, 2021, which claims the benefit of Provisional Application No. 63/112,898, filed Nov. 12, 2020, the disclosure of which is incorporated by reference in its/their entirety herein.

TECHNICAL FIELD

The present disclosure broadly relates to curable compositions, abrasive articles, and methods of making them.

BACKGROUND

In general, coated abrasive articles have abrasive particles secured to a backing. More typically, coated abrasive articles comprise a backing having two major opposed surfaces and an abrasive layer secured to a major surface. The abrasive layer typically comprises abrasive particles and a binder, wherein the binder serves to secure the abrasive particles to the backing.

One common type of coated abrasive article has an abrasive layer comprising a make layer, a size layer, and abrasive particles. In making such a coated abrasive article, a make layer comprising a first binder precursor is applied to a major surface of the backing. Abrasive particles are then at least partially embedded into the make layer (e.g., via electrostatic coating), and the first binder precursor is cured (i.e., crosslinked) to secure the particles to the make layer. A size layer comprising a second binder precursor is then applied over the make layer and abrasive particles, followed by curing of the binder precursors. Some coated abrasive articles further comprise a supersize layer covering the abrasive layer. The supersize layer typically includes grinding aids and/or anti-loading materials.

Another common type of coated abrasive article (commonly known as a "structured abrasive article") comprises a structured abrasive layer secured to a major surface of a backing. The structured abrasive layer has a plurality of shaped abrasive composites (often pyramids) comprising abrasive particles retained in a binder.

Nonwoven abrasive articles typically include a lofty open nonwoven fiber web having abrasive particles bonded thereto by a binder.

Bonded abrasive articles typically include a shaped mass of abrasive particles held together by a binder.

For all of these abrasive articles, the ability of the binder to securely retain the abrasive particles is a key factor in their success during abrading processes. Often this is accomplished using a polar thermosetting resin such as epoxy or phenolic binder. Other times, especially in the case of structured abrasive articles, the binder is a radiation cured acrylic binder. Various combinations of these binders, all of which are typically rigid binders, have also been used. However, these resins may not be preferred for some abrading processes such as, for example, those in which improved adhesion to nonpolar substrates or improved flexibility and/or toughness of the binder is desired.

SUMMARY

There remains a need for new and improved curable compositions that can be used to make abrasive articles.

Advantageously, curable compositions according to the present disclosure provide tough cohesively strong binders that retain abrasive particles well even at high working temperatures while exhibiting good vibration tolerance.

In one aspect, the present disclosure provides a curable composition comprising at least one cyclic olefin capable of undergoing ring opening metathesis polymerization;

at least one ring opening metathesis polymerization catalyst or precursor catalyst thereof;

abrasive particles having surface hydroxyl groups; and a difunctional coupling agent represented by the structure

Z-X-Z wherein each Z independently represents a group that is chemically reactive with at least one of the surface hydroxyl groups of one of the abrasive particles thereby forming at least one covalent bond, and wherein X represents a divalent organic linking group have a number average molecular weight of 500 to 10000 grams per mole.

In another aspect, the present disclosure provides an abrasive article comprising abrasive particles and an at least partially cured reaction product a curable composition according to the present disclosure. The abrasive articles may be coated, nonwoven, or bonded abrasive articles.

In one embodiment, the abrasive article comprises:

a backing having opposed major surfaces;

a make layer disposed on one of the major surfaces of the backing, wherein the make layer comprises an at least partially cured reaction product of a curable composition comprising:

at least one cyclic olefin capable of undergoing ring opening metathesis polymerization;

at least one ring opening metathesis polymerization catalyst;

a difunctional coupling agent represented by the structure

Z-X-Z wherein each Z independently represents a group that is chemically reactive with at least one of the surface hydroxyl groups of one of the abrasive particles thereby forming at least one covalent bond, and wherein X represents a divalent organic linking group have a number average molecular weight of 1000 to 10000 grams per mole;

abrasive particles partially embedded in the make layer; and a size layer disposed over the make layer and abrasive particles.

Features and advantages of the present disclosure will be further understood upon consideration of the detailed description as well as the appended claims.

Figure 1:
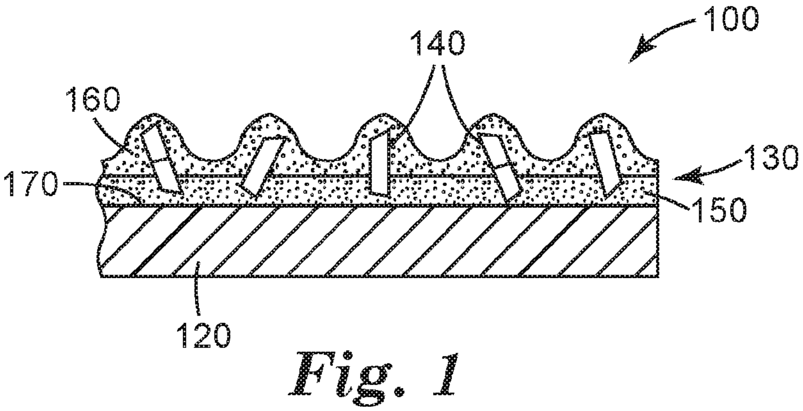
FIG. 1 is a schematic cross-sectional view of an exemplary coated abrasive article including abrasive particles according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Curable compositions according to the present disclosure comprise: at least one cyclic olefin capable of undergoing ring opening metathesis polymerization; at least one ring opening metathesis polymerization catalyst or precursor catalyst thereof; abrasive particles having surface hydroxyl groups; and a difunctional coupling agent as described hereinabove.

Ring opening metathesis polymerization (ROMP) is a well known process that converts cyclic olefins into polymer using a ROMP catalyst. Metathesis polymerization of cycloalkene monomers typically yields crosslinked polymers having an unsaturated linear backbone. The degree of unsaturation of the repeat backbone unit of the polymer is the same as that of the monomer. For example, with a norbornene reactant in the presence of an appropriate catalyst, the resulting polymer may be represented by:

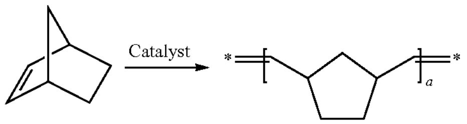

wherein a is the number of repeating monomer units in the polymer chain.

For another example, with dienes such as dicyclopentadiene in the presence of an appropriate catalyst, the resulting polymer may be represented by:

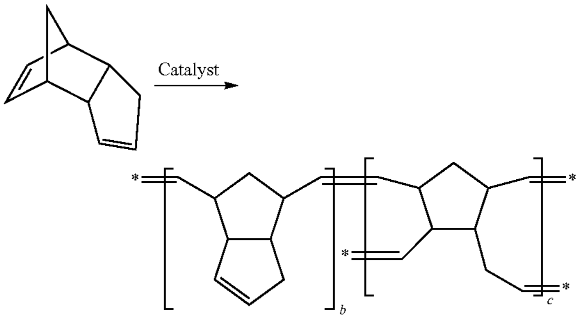

wherein b+c is the number of moles of polymerized monomer, and c/(b+c) is the mole fraction of monomer units which ring-open at both reactive sites. As shown by the above reaction, metathesis polymerization of dienes, trienes, etc. can result in a crosslinked polymer. Representative cycloalkene monomers, catalysts, procedures, etc. that can be used in metathesis polymerizations are described, for example, in: U.S. Pat. No. 4,400,340 (Klosiewicz); U.S. Pat. No. 4,751,337 (Espy et al.); U.S. Pat. No. 5,849,851 (Grubbs et al.); and U.S. Pat. No. 6,800,170 B2 (Kendall et al.); and U. S. Pat. Appl. Publ. No. 2007/0037940 A1 (Lazzari et al.).

As used herein, the term "cyclic monomer" refers to monomers having at least one cyclic group and may include bicyclics and tricyclics. A mixture of cyclic monomers may be used.

Exemplary cyclic monomers include norbornylene (2-norbornene), ethylidenenorbornene, cyclopentene, cis-cyclooctene, dicyclopentadiene, tricyclopentadiene, tetracyclopentadiene, norbornadiene, 7-oxobicyclo[2.2.1]hept-2-ene, tetracyclo[6,2,13,6,$0^{2,7}$]dodeca-4,9-diene, and derivatives thereof with substituents including aliphatic groups, aromatic groups, esters, amides, ethers, and silanes.

Combinations of cyclic monomers may be used. For example, a combination of dicyclopentadiene and norbornylene, dicyclopentadiene and an alkyl norbornylene, or dicyclopentadiene and ethylidenenothornene may be used.

Useful alkyl norbornylenes may be represented by the formula:

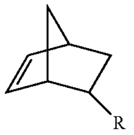

wherein R is an alkyl group comprising from 1 to 12 carbon atoms, e.g., 6 carbon atoms. One useful combination of cyclic monomers comprises dicyclopentadiene and hexylnorbornylene at a weight ratio of from about 10:90 to about 50:50. Another useful combination of cyclic monomers comprises dicyclopentadiene and cyclooctene at a weight ratio of from about 30:70 to about 70:30.

Additional examples of useful cyclic monomers include the following polycyclic dienes:

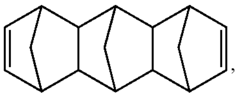,
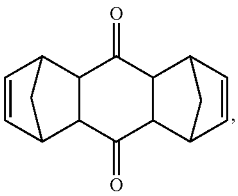,
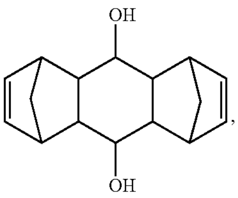,
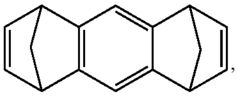,
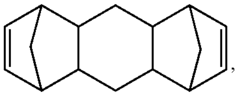,
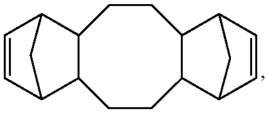, and
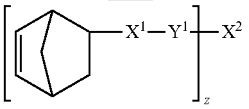

where $X^1$ is a divalent aliphatic or aromatic group with 0 to 20 carbon atoms; $X^2$ is a multivalent aliphatic or aromatic group with 0 to 20 carbon atoms; optional group $Y^1$ is a divalent functional group selected from the group consisting of esters, amides, ethers, and silanes; and z is 2 or greater.

Metathesis polymerization of dienes, trienes, etc. can result in a crosslinked polymer as described above for dicyclopentadiene. The degree to which crosslinking occurs depends on the relative amounts of different monomers and on the conversion of the reactive groups in those monomers, which in turn, is affected by reaction conditions including time, temperature, catalyst choice, and monomer purity. In general, at least some crosslinking is desired to provide suitable mechanical properties for abrasive articles. The presence of crosslinking is indicated, for example, when the cured composition does not dissolve in some solvent such as toluene, but may swell in such solvents. Also, the crosslinked polymers are thermoset and not thermoplastic and cannot be made to flow upon heating. Typically, an at least partially cured composition becomes stiffer as the amount of crosslinking increases, thus the amount of crosslinking desired may depend on the desired stiffness of the cured composition (e.g., in an abrasive article).

In some embodiments, at least partially cured compositions may comprise a crosslinked unsaturated polymer formed by ring opening metathesis polymerization of a crosslinker (a multicyclic monomer comprising at least two reactive double bonds) and a monofunctional monomer. For example, the unsaturated polymer may be comprised of dicyclopentadiene and a monofunctional monomer. The monofunctional monomer may be selected from the group consisting of cyclooctene, cyclopentadiene, an alkyl norbornene, and derivatives thereof. The monomer composition may also comprise from about 0.1 to about 75 wt. % of the crosslinker, relative to the total weight of the monomer composition. If dicyclopentadiene is used as a crosslinker, useful amounts are from about 10 to about 75 wt. % of dicyclopentadiene, relative to the total weight of the monomer composition. If the polycyclic dienes shown above are used as crosslinkers, useful amounts are from about 0.1 to about 10 wt. %, relative to the total weight of the monomer composition.

In embodiments in which at least two different cyclic monomers are used to make at least partially cured compositions (e.g., in abrasive articles), the relative amounts of the monomers may vary depending on the particular monomers and desired properties of the articles. The unsaturated polymer may comprise: from about 0 to about 100 wt. % of a multifunctional polycyclic monomer, and from about 0 to about 100 wt. % of a monofunctional cyclic monomer, both relative to the total weight of the polymer. In some embodiments, the mole ratio of multifunctional polycylic monomer to monofunctional cyclic monomer comprises from about 1:3 to about 1:7.

The desired physical properties of a given at least partially cured composition may be used to select the particular monomer(s) used in the corresponding curable composition. If more than one monomer is used, these physical properties may also influence the relative amounts of the monomers used. Physical properties that may need to be considered include glass transition temperature ($T_g$) and Young's Modulus. For example, if a stiff composition is desired, then the particular monomer(s), and their relative amounts if more than one monomer is used, may be chosen such that the unsaturated polymer has a $T_g$ of greater than about 25° C. and a Young's Modulus greater than about 100 megapascals (MPa).

In choosing the relative amounts of comonomers, the contribution of each monomer to the glass transition temperature of the unsaturated polymer can be used to select an appropriate ratio. If a stiff cured composition is desired, the unsaturated polymer may have a $T_g$ greater than about 25° C. and a Young's Modulus greater than about 100 MPa. Monomers that may be used to make stiff composition include any of those described herein and particularly norbornylene, ethylidenenorbornene, dicyclopentadiene, and tricyclopentadiene, with dicyclopentadiene being particularly preferred. Any amount of crosslinking may be present.

If a flexible cured composition is desired, the unsaturated polymer may have a $T_g$ less than about and a Young's Modulus less than about 100 MPa. Monomers that may be used to make flexible cured compositions may include combinations of crosslinkers and monofunctional cyclic monomers.

Monomers that may be used to make flexible cured compositions include any of those described herein and particularly dicyclopentadiene, cyclooctene, cyclopentene, and alkyl norbornylenes such as the ones described above wherein $R^1$ comprises from 1 to 12 carbon atoms. The monomer composition may comprise from about 0.1 to about 75 wt. % of the crosslinker, relative to the total weight of the monomer composition with preferred amounts comprising from about 1 to about 50 wt. %, or from about 20 to about 50 wt. %. An exemplary curable composition comprises dicyclopentadiene and cyclooctene at a weight ratio of from about 30:70 to about 70:30, preferably about 50:50. Another exemplary curable composition comprises dicyclopentadiene and hexylnorbornylene at a weight ratio of from about 10:90 to preferably from about 20:80 to about 40:60.

Besides the ROMP monomers described above, the curable composition comprises a ROMP catalyst, for example, such as the catalysts described in the above references. Transition metal carbene catalysts such as ruthenium, osmium, and rhenium catalysts may be used, including versions of Grubbs catalysts and Grubbs-Hoveyda catalysts; see, for example, U.S. Pat. No. 5,849,851 (Grubbs et al.).

In some embodiments, the curable composition comprises a metathesis catalyst system comprising a compound of the formula:

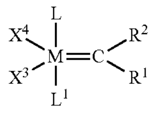

wherein:

M is selected from the group consisting of Os and Ru;

$R^1$ and $R^2$ are independently selected from the group consisting of hydrogen and a substituent group selected from the group consisting of $C_1$-$C_{20}$ alkyl, $C_2$-$C_{20}$ alkenyl, $C_2$-$C_{20}$ alkoxycathonyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy and aryloxy; the substituent group optionally substituted with a moiety selected from the group consisting of $C_1$-$C_5$ alkyl, halogen, $C_1$-$C_5$ alkoxy and phenyl; the phenyl optionally substituted with a moiety selected from the group consisting of halogen, $C_1$-$C_5$ alkyl, and $C_1$-$C_5$ alkoxy;

$X^3$ and $X^4$ are independently selected from any anionic ligand; and

L and $L^1$ are independently selected from any phosphine of the formula $PR^3R^4R^5$, wherein $R^3$ is selected from the group consisting of neopentyl, secondary alkyl and cycloalkyl and wherein $R^4$ and $R^5$ are independently selected from the group consisting of aryl, neopentyl, $C_1$-$C_{10}$ primary alkyl, secondary alkyl, and cycloalkyl.

The metathesis catalyst system may also comprise a transition metal catalyst and an organoaluminum activator. The transition metal catalyst may comprise tungsten or molybdenum, including their halides, oxyhalides, and oxides. One particularly preferred catalyst is $WCl_6$. The organoaluminum activator may comprise trialkylaluminums, dialkylaluminum halides, or alkylaluminum dihalides. Organotin and organolead compounds may also be used as activators, for example, tetraalkyltins and alkyltin hydrides may be used. One particularly preferred catalyst system comprises $WCl_6/(C_2H_5)_2AlCl$.

The choice of particular catalyst system and the amounts used may depend on the particular monomers being used, as well as on desired reaction conditions, desired rate of cure, and so forth. In particular, it can be desirable to include the above-described osmium and ruthenium catalysts in amounts of from about 0.001 to about 0.3 wt. %, relative to the total weight of the unsaturated polymer. For curable compositions comprising cyclooctene, the osmium and ruthenium catalyst may be used. For curable compositions comprising dicyclopentadiene and alkylnorbornylenes, metathesis catalyst systems comprising tungsten are useful.

The curable composition may comprise additional components. For example, if the metathesis catalyst system comprises $WCl_6/(C_2H_5)_2AlCl$, then water, alcohols, oxygen, or any oxygen-containing compounds may be added to increase the activity of the catalyst system. Other additives can include chelators, Lewis bases, plasticizers, inorganic fillers, and antioxidants, preferably phenolic antioxidants.

Photocatalysts for catalyzing ROMP described in U.S. Pat. No. 5,198,511 (Brown-Wensley et al.), the disclosure of which is incorporated herein by reference, and may be used if photocuring is desired.

To maximize dimensional stability of at least partially cured compositions, it is typically desirable that no solvent be included in the formulations. If solvent is used to help initially dissolve some component of the catalyst system, it is typically desirable to remove the solvent under vacuum before polymerizing the mixture.

If the monomer composition is sensitive to ambient moisture and oxygen, it may be desirable to maintain the reactive solutions under inert conditions.

Useful abrasive particles have surface hydroxyl groups. Examples of suitable abrasive particles include: fused aluminum oxide; heat-treated aluminum oxide; white fused aluminum oxide; ceramic aluminum oxide materials such as available as 3M CERAMIC ABRASIVE GRAIN from 3M Company; brown aluminum oxide; blue aluminum oxide; garnet; fused alumina zirconia; iron oxide; chromia; zirconia; titania; tin oxide; quartz; feldspar; flint; emery; sol-gel-derived abrasive particles (e.g., including both precisely-shaped and crushed forms); and combinations thereof.

Preferably, the abrasive particles (especially precisely-shaped abrasive platelets) comprise sol-gel-derived alpha-alumina particles.

Abrasive particles composed of crystallites of alpha-alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U. S. Publ. Pat. Appln. Nos. 2009/0165394 A1 (Culler et al.) and 2009/0169816 A1 (Erickson et al.).

Alpha-alumina-based precisely-shaped abrasive particles can be made according to a well-known multistep processes. Briefly, the method comprises the steps of making either a seeded or non-seeded sol-gel alpha-alumina precursor dispersion that can be converted into alpha-alumina; filling one or more mold cavities having the desired outer shape of the precisely-shaped abrasive particle with the sol-gel, drying the sol-gel to form precursor precisely-shaped ceramic abrasive particles; removing the precursor precisely-shaped ceramic abrasive particles from the mold cavities; calcining the precursor precisely-shaped ceramic abrasive particles to form calcined, precursor precisely-shaped ceramic abrasive particles, and then sintering the calcined, precursor precisely-shaped ceramic abrasive particles to form precisely-shaped ceramic abrasive particles. Further details concerning methods of making sol-gel-derived abrasive particles can be found in, for example, U.S. Pat. No. 4,314,827 (Leitheiser); U.S. Pat. No. 5,152,917 (Pieper et al.); (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/U.S. Pat. No. 0,165,394 A1 (Culler et al.). Further examples of sol-gel-derived precisely-shaped alpha-alumina (i e, ceramic) abrasive particles can be found in U.S. Pat. No. 5,201,916 (Berg); U.S. Pat. No. 5,366,523 (Rowenhorst (Re 35,570)); (Berg); U.S. Pat. No. 8,142,531 (Adefris et al.); U.S. Pat. No. 8,142,891 (Culler et al.); and U.S. Pat. No. 8,142,532 (Erickson et al.); and in U. S. Pat. Appl. Publ. Nos. 2012/0227333 (Adefris et al.); 2013/0040537 (Schwabel et al.); and 2013/0125477 (Adefris).

In some embodiments, the base and the top of the precisely-shaped abrasive particles are substantially parallel, resulting in prismatic or truncated pyramidal shapes, although this is not a requirement. In some embodiments, the sides of a truncated trigonal pyramid have equal dimensions and form dihedral angles with the base of about 82 degrees. However, it will be recognized that other dihedral angles (including 90 degrees) may also be used. For example, the dihedral angle between the base and each of the sides may independently range from 45 to 90 degrees, typically 70 to 90 degrees, more typically 75 to 85 degrees.

It is also contemplated that the abrasive particles could comprise abrasive agglomerates such, for example, as those described in U.S. Pat. No. 4,652,275 (Bloecher et al.), U.S. Pat. No. 4,799,939 (Bloecher et al.), U.S. Pat. No. 6,521,004 (Culler et al.), or U.S. Pat. No. 6,881,483 (McArdle et al.).

In some embodiments, the abrasive particles have a Mohs hardness of at least 4, at least 5, at least 6, at least 7, or even at least 8.

In some preferred embodiments, the abrasive particles comprise shaped ceramic abrasive particles (e.g., shaped sol-gel-derived polycrystalline alpha alumina particles) that are generally triangularly-shaped (e.g., a triangular prism or a truncated three-sided pyramid).

The abrasive particles are typically selected to have a length in a range of from 1 micron to 4 millimeters, more typically 10 microns to about 3 millimeter, and still more typically from 150 to 2600 microns, although other lengths may also be used.

The abrasive particles are typically selected to have a width in a range of from 0.1 micron to 3500 microns, more typically 100 microns to 3000 microns, and more typically 100 microns to 2600 microns, although other lengths may also be used.

The abrasive particles are typically selected to have a thickness in a range of from 0.1 micron to 1600 microns, more typically from 1 micron to 1200 microns, although other thicknesses may be used.

In some embodiments, the abrasive particles may have an aspect ratio (length to thickness) of at least 2, 3, 4, 5, 6, or more.

The abrasive particles may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard) ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JI58, JIS12, JIS16, JI524, JIS36, JI546, JI554, JIS60, JIS80, JIS100, JIS150, JIS180, JI5220, JIS240, JI5280, JI5320, JIS360, JIS400, JIS600, JIS800, JIS1000, JIS1500, JI52500, JIS4000, JIS6000, JIS8000, and JIS10,000.

According to an embodiment of the present disclosure, the average diameter of the abrasive particles may be within a range of from 260 to 4000 microns in accordance with FEPA grades F60 to F24.

Alternatively, the abrasive particles can be graded to a nominal screened grade using U.S.A. Standard Test Sieves conforming to ASTM E11-17 "Standard Specification for Woven Wire Test Sieve Cloth and Test Sieves". ASTM E11-17 prescribes the requirements for the design and construction of testing sieves using a medium of woven wire cloth mounted in a frame for the classification of materials according to a designated particle size. A typical designation may be represented as −18+20 meaning that the abrasive particles pass through a test sieve meeting ASTM E11-17 specifications for the number 18 sieve and are retained on a test sieve meeting ASTM E11-17 specifications for the number 20 sieve. In one embodiment, the abrasive particles have a particle size such that most of the particles pass through an 18 mesh test sieve and can be retained on a 20, 25, 30, 35, 40, 45, or 50 mesh test sieve. In various embodiments, the abrasive particles can have a nominal screened grade of: −18+20, −201+25, −25+30, −30+35, −35+40, 5−40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size can be used such as −90+100.

The difunctional coupling agent is represented by the structure

Z-X-Z

Each Z independently represents a group that is chemically reactive with at least one of the surface hydroxyl groups of one of the abrasive particles thereby forming at least one covalent bond. Examples include isocyanate groups (i.e., —N═C═O) and silyl groups having one to 3 hydrolyzable groups bonded thereto. Exemplary silyl group can be represented by the formula $—SiR^6{}_aL^2{}_{(3-a)}$, wherein each $L^2$ independently represents a hydrolyzable group (e.g., Cl, Br, acetoxy, methoxy, ethoxy, and/or hydroxyl), wherein $R^6$ represents an alkyl group having from 1 to 4 carbon atoms, and wherein a is 0, 1, or 2. In preferred embodiments a is 0.

Each X independently represents a divalent organic linking group have a number average molecular weight (M n) of 500 to 10000 grams per mole, preferably 600 to 6000 grams per mole. For example, the X may have an M n of 500, 600, 70., 800, 900, of 1000 grams/mole up to 6000, 7000, 8000, 9000, or 10000 grams/mole in any combination.

In some preferred embodiments, the difunctional coupling agent comprises an isocyanate-terminated polyurethane prepolymer; for example, a diphenylmethane diisocyanate (e.g., 4,4'-methylenebis(phenyl isocyanate))-terminated polyether prepolymer based on a polytetramethylene ether glycol. Exemplary polyalkylene ether diols include polyethylene glycol, polypropylene glycol, polytrimethylene ether glycol (i.e., $HO(CH_2CH_2CH_2O)_nH$), and polytetramethylene ether glycol (i.e., $HO(CH_2CH_2CH_2CH_2O)_nH$). The resulting prepolymers may have polyoxyalkylene divalent segments such as, for example, a polyoxyethylene segment, a polyoxypropylene segment, and/or a polyoxybutylene segment.

One preferred isocyanate-terminated polyurethane prepolymer is a modified diphenylmethane diisocyanate (MDI)-terminated polyether prepolymer based on polytetramethylene ether glycol (PTMEG) available as BAYTEC ME-230 from Covestro, Pittsburgh, Pennsylvania.

Isocyanate-terminated polybutadiene prepolymers can be prepared, for example, by reaction of a diisocyanate with a hydroxyl-terminated polyoxyalkylene or a hydroxyl-terminated polybutadiene. Polyoxyalkylene polymers having hydrolyzable silyl end groups can be prepared, for example, by reaction of a corresponding hydroxyl-terminated polyoxyalkylene with an isocyanato functional hydrolysable organosilane (e.g., isocyanatoethyltrimethoxysilane or isocyanatoethyltriethoxysilane).

Exemplary commercially available OH-terminated polybutadienes include those available from Evonik Industries AG, Essen, Germany, as POLYVEST HT ($M_n$=2,900 g/mole), and from Cray Valley, Exton, Pennsylvania, as POLY BD R-45HTLO ($M_n$=2800 g/mol), POLY BD R-20LM ($M_n$=1200), KRASOL LBH 2000 (2100 g/mol), and KRASOL LBH 3000 (3000 g/mol).

Haile-terminated polybutadienes can be prepared by anionic: polymerization and capping the end of the polybutadiene with a hydrolyzable silane (e.g., tetramethoxysilane or tetraethoxysilane). Suitable hydrolyzable silane-terminated liquid polybutadienes are also commercially available; for example, from Evonik, Marl, Germany, as POLYVEST EP ST-M 60 ($M_n$~3300 g/mole) and RICON 603 silane-functional polybutadiene ($M_n$=3300 g/mole, difunctional) from Total Cray Valley, Exton, Pennsylvania.

The curable composition may further comprise one or more optional additives. Examples include plasticizers, antioxidants, UV stabilizers, colorants (e.g. carbon black), (e.g. inorganic) fillers such as (e.g. fumed) silica, diluent crushed abrasive particles (e.g., as described hereinabove), grinding aids, and polymeric and/or inorganic fibers. Useful grinding aids include cryolite, fluoroborates (e.g., potassium tetrafluoroborate), metal salts of fatty acids (e.g., zinc stearate or calcium stearate), salts of phosphate esters (e.g., potassium behenyl phosphate), phosphate esters, urea-formaldehyde resins, mineral oils, crosslinked silanes, crosslinked silicones, and/or fluorochemicals.

The curable composition may be typically made by combining the requisite components using any suitable technique. No special requirements are generally necessary. Once combined, curing may be spontaneous and/or accelerated by heating and/or actinic radiation (e.g., from an ultraviolet lamp or light emitting diode (LED) lamp).

Curable compositions according to the present disclosure are useful in the manufacture of abrasive articles. Accordingly, abrasive articles may comprise abrasive particles at least partially retained in an at least partially cured reaction product of the curable composition.

Abrasive articles may include, for example, coated abrasive articles, bonded abrasive articles, and nonwoven abrasive articles comprising a binder and a plurality of abrasive particles.

Coated abrasive articles generally include a backing, abrasive particles, and at least one binder to hold the abrasive particles onto the backing. Examples of suitable backing materials include woven fabric, polymeric film, vulcanized fiber, a nonwoven fabric, a knit fabric, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An exemplary embodiment of a coated abrasive article according to the present disclosure is depicted in FIG. 1. Referring to FIG. 1, coated abrasive article 100 has a backing 120 and abrasive layer 130. Abrasive layer 130 includes abrasive particles 140 secured to a major surface 170 of backing 120 (substrate) by make layer 150 and size layer 160. Abrasive particles are partially embedded in make layer 150. Size layer 160 is disposed over make layer 150 and abrasive particles 140. Additional layers, for example, such as an optional supersize layer (not shown) that is superimposed on the size layer, or an optional backing antistatic treatment layer (not shown) may also be included.

In a typical process for making this type of coated abrasive article a precursor make layer is disposed on one major surface of the backing. The make layer precursor comprises:

at least one cyclic olefin capable of undergoing ring opening metathesis polymerization;

at least one ring opening metathesis polymerization catalyst; and a difunctional coupling agent represented by the structure

Z-X-Z wherein each Z independently represents a group that is chemically reactive with at least one of the surface hydroxyl groups of one of the abrasive particles thereby forming at least one covalent bond, and wherein X represents a divalent organic linking group have a number average molecular weight of 1000 to 10000 grams per mole.

The precursor make layer may then optionally be partially cured and then abrasive particles are partially embedded therein. Subsequent results in abrasive particles partially embedded in the make layer. A precursor size layer is then disposed over the make layer and abrasive particles and cured to make the size layer. Optionally a supersize may be coated over the size layer and optionally cured.

Suitable binder materials for use in the precursor size layer (and cured to form the size layer) may include organic binders such as, for example, thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant alpha, beta-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the preferred properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.); U.S. Pat. No. 4,751,138 (Tumey et al.); and U.S. Pat. No. 5,436,063 (Follett et al.).

Binder materials for the make, size, and optional supersize layers may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, and iron titanium. Other miscellaneous grinding aids include sulfur, organic sulfur compounds, graphite, and metallic sulfides. A combination of different grinding aids may be used, and in some instances, this may produce a synergistic effect.

Figure 2:
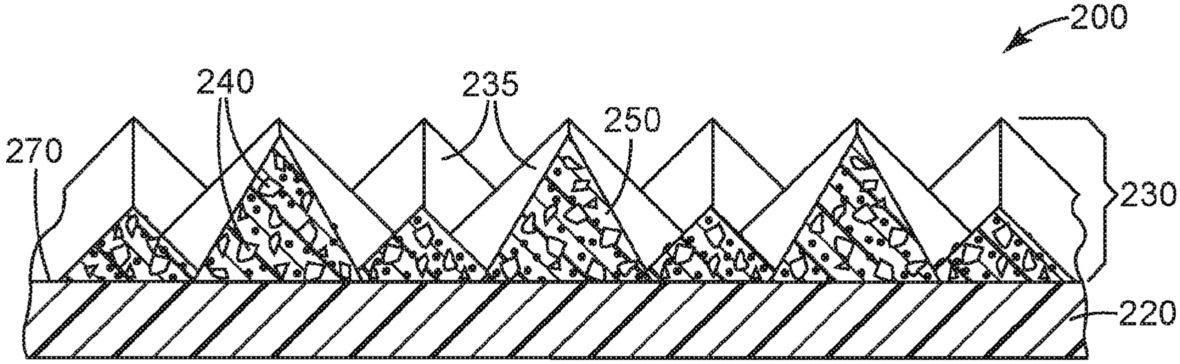
FIG. 2 is a schematic cross-sectional view of another exemplary coated abrasive article including abrasive particles according to the present disclosure.

Another exemplary coated abrasive article according to the present disclosure is depicted in FIG. 2. Referring to FIG. 2, exemplary coated abrasive article 200 has a backing 220 (substrate) and structured abrasive layer 230. Structured abrasive layer 230 includes a plurality of shaped abrasive composites 235 comprising abrasive particles 240 according to the present disclosure dispersed in a binder material 250 secured to a major surface 270 of backing 220. The binder material is an at least partially cured reaction product of a cured composition according to the present disclosure.

Such structured abrasive articles can be made by filling a production tool with a curable composition according to the present disclosure, then contacting it with a backing, curing the curable composition, thereby securing it to the backing, and separating the tool from the finished structured abrasive article.

Further details regarding coated abrasive articles can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); (Culler et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,961,674 (Gagliardi et al.), and U.S. Pat. No. 5,975,988 (Christianson).

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about one cm to over one meter; the diameter of cut off wheels about one cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g., double disc grinder) or other conventional bonded abrasive shape. Bonded abrasive articles typically comprise about 3 to 50 percent by volume of bond material comprising and at least partially cured composition according to the present disclosure, about 30 to 90 percent by volume abrasive particles (or abrasive particle blends), up to 50 percent by volume additives (including grinding aids), and up to 70 percent by volume pores, based on the total volume of the bonded abrasive article.

Figure 3:
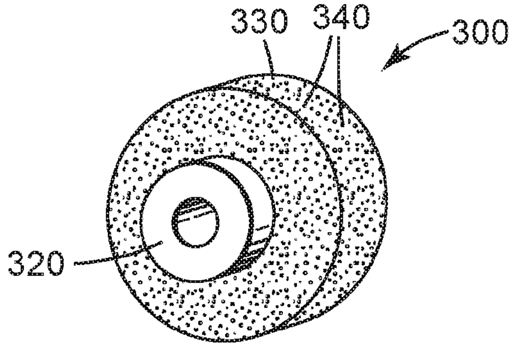
FIG. 3 is a schematic perspective view of an exemplary bonded abrasive article including abrasive particles according to the present disclosure.

An exemplary form is a grinding wheel. Referring to FIG. 3, grinding wheel 300 according to the present disclosure includes abrasive particles 340 according to the present disclosure, retained by a binder material 330 comprising an at least partially cured composition according to the present disclosure, molded into a wheel, and mounted on hub 320.

Further details regarding resin bonded abrasive articles, and how to make them, can be found, for example, in U.S. Pat. No. 4,800,685 (Haynes et al.) and U.S. Pat. No. 9,180,573 (Givot et al.), the disclosures of which are incorporated herein by reference.

Figure 4:
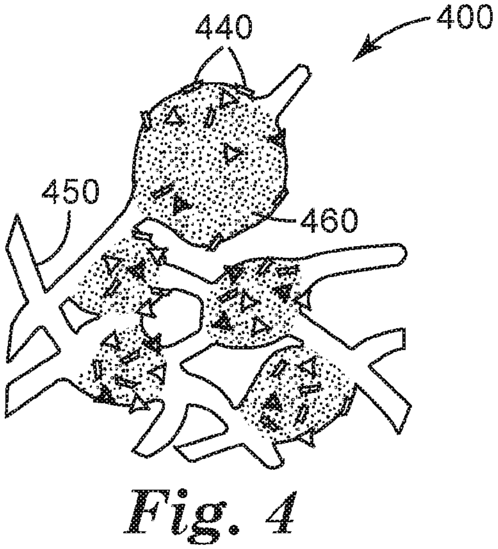
FIG. 4 is an enlarged schematic view of a nonwoven abrasive article including abrasive articles according to the present disclosure.

Nonwoven abrasive articles typically include an open porous lofty polymer filament structure having abrasive particles according to the present disclosure distributed throughout the structure and adherently bonded therein by an organic binder. Examples of filaments include polyester fibers, polyamide fibers, and polyaramid fibers. In FIG. 4, a schematic depiction, enlarged about 100×, of an exemplary nonwoven abrasive article 400 according to the present disclosure is provided. Such a nonwoven abrasive article according to the present disclosure comprises a lofty open nonwoven fiber web 450 (substrate) onto which abrasive particles 440 according to the present disclosure are adhered by binder material 460.

Further details regarding nonwoven abrasive articles can be found, for example, in U.S. Pat. No. 2,958,593 (Hoover et al.); U.S. Pat. No. 4,227,350 (Fitzer); U.S. Pat. No. 4,991,362 (Heyer et al.); U.S. Pat. No. 5,712,210 (Windisch et al.); (Edblom et al.); U.S. Pat. No. 5,681,361 (Sanders); U.S. Pat. No. 5,858,140 (Berger et al.); U.S. Pat. No. 5,928,070 (Lux); and U.S. Pat. No. 6,017,831 (Beardsley et al.).

The present disclosure also provides a method of abrading a workpiece. The method comprises: frictionally contacting abrasive particles according to the present disclosure with a surface of the workpiece, and moving at least one of the abrasive particles and the surface of the workpiece relative to the other to abrade at least a portion of the surface of the workpiece. Methods for abrading with abrasive particles according to the present disclosure include, for example, snagging (i.e., high-pressure high stock removal) to polishing (e.g., polishing medical implants with coated abrasive belts), wherein the latter is typically done with finer grades (e.g., ANSI 220 and finer) of abrasive particles. The abrasive particles may also be used in precision abrading applications such as grinding cam shafts with vitrified bonded wheels. The size of the abrasive particles used for a particular abrading application will be apparent to those skilled in the art.

Abrading may be carried out dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Examples of workpieces include aluminum metal, carbon steels, mild steels (e.g., 1018 mild steel and 1045 mild steel), tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms (kg), although other pressures can also be used.

Objects and advantages of this disclosure are further illustrated by the following non-limiting examples, but the particular materials and amounts thereof recited in these examples, as well as other conditions and details, should not be construed to unduly limit this disclosure.

Examples

Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

| DESIGNATION | DESCRIPTION |
|---|---|
| CB1 | Crosslinkable binder; olefin thermoset resin obtained as PROXIMA HPR 2128 from Materia Inc., Pasadena, California |
| CB2 | Crosslinkable binder; olefin thermoset resin obtained as PROXIMA HTI 1837 from Materia Inc. |
| CB3 | Crosslinkable binder; olefin thermoset resin obtained as PROXIMA HTI 1400 from Materia Inc. |
| C1 | Catalyst; Olefin metathesis catalyst (1% in mineral oil), obtained as PROXIMA CT 762 from Materia Inc. |
| C2 | Catalyst; Olefin metathesis catalyst (1% in mineral oil), obtained as PROXIMA CT 170 from Materia Inc. |
| C3 | Catalyst; Olefin metathesis catalyst (1% in mineral oil), obtained as PROXIMA CT 714 from Materia Inc. |
| A1 | Abrasive grain P-180, P180 Blue Aluminum Oxide, obtained as ALODUR BFRPL from Imerys Fused Minerals, Niagara Falls, New York |

TABLE 1-continued

| DESIGNATION | DESCRIPTION |
|---|---|
| A2 | Abrasive grain P-320, P320 Aluminum Oxide, obtained as ALODUR BFRPL from Imerys Fused Minerals |
| A3 | Abrasive grain, P-180 Silicon Carbide, obtained as CARBOREX G21 from Washington Mills Electro Minerals, North Grafton, Massachusetts |
| A4 | Abrasive grain, P-80, P80 Blue Aluminum Oxide obtained as ALODUR BFRPL from Imerys Fused Minerals |
| AP1 | Adhesion promoter; Modified diphenylmethane diisocyanate (MDI)-terminated polyether prepolymer based on polytetramethylene ether glycol (PTMEG), obtained as BAYTEC ME-230 from Covestro, Pittsburg, Pennsylvania |
| D1 | Dispersant; Solvent-free wetting and dispersing additive, obtained as DISPERBYK-145 from BYK USA, Inc., Wallingford, Connecticut |
| S1 | Solvent: toluene |
| AP2 | Methoxy silane-terminated (trimethoxysilane) polybutadiene obtained as POLYVEST EP ST-M from Evonik, Parsippany, New Jersey |
| TS-720 | Fumed silica obtained as CAB-O-SIL TS-720 from Cabot Corporation, Boston, Massachusetts |
| PolyMDI | Wannate PM2005 (a polymeric form of methylene phenyl isocyanate) from Wanhua, Yantai, China |
| MLQ | Mondur MLQ (2,4'-MDI and 4,4'-MDI) from Covestro, Leverkusen, Germany. |
| PB2100 | Polybutadiene diol obtained as KRASOL LBH2000 ($M_n$ = 2100 g/mole) from Cray Valley, Exton, Pennsylvania |
| PTHF2900 | Poly(THF) diol ($M_n$ = 2900 g/mole) from Sigma-Aldrich, Saint Louis, Missouri |
| PTHF1000 | Poly(THF) diol ($M_n$ = 1000 g/mole) from Sigma-Aldrich |
| PTHF650 | Poly(THF) diol ($M_n$ = 650 g/mole) from Sigma-Aldrich |
| PPO2000 | Poly (propylene oxide) ($M_n$ = 2000 g/mole) from Sigma-Aldrich |
| PEO1450 | Poly(ethylene oxide) ($M_n$ = 1450 g/mole) obtained as P1492 from Spectrum Chemical, New Brunswick, New Jersey |
| PC2000 | Polycarbonate ($M_n$ = 2000 g/mole) obtained as HD56 Oxymer from Perstorp, Malmo, Sweden |
| PC1000 | Polycarbonate ($M_n$ = 1000 g/mole) obtained as HD112 Oxymer from Perstorp, Malmo, Sweden |
| Polyester2000 | Hydroxyl-terminated saturated linear polyester, obtained as FOMREZ G24-56 from FOMREZ, Middlebury, Connecticut |

Scheiffer Cut Test Method

E-5 to E-26 abrasive article specimens were prepared as 10.2 centimeter (cm) diameter discs that are adhered to an exactly the same diameter double sided adhesive film on one side while the other adhesive side of the adhesive film was adhered to a loop fastener fabric, (for example, SITIP Net 150 grams per square meter (gsm) loop backing, SITIP INDUSTRIE TESSILI, Cene, Italy), and then secured to a foam back-up pad by means of a hook-and-loop fastener. The back-up pad/fastener assembly had a Shore Durometer hardness of 85. The abrasive disc and back-up pad assembly was installed on a Schieffer Uniform Abrasion Tester (available from Frazier Precision Instrument Company, Inc. Hagerstown, Maryland), and the abrasive disc was used to abrade a 10.2 cm diameter disc of cellulose acetate butyrate polymer from Seelye-Eiler Plastics Inc., Bloomington, Minnesota. The load was 5 pounds (2.27 kilograms). The test was performed in two steps, a first step of 500 cycles, after which the before and after difference weight of the cellulose acetate butyrate polymer disc is defined as initial cut, then a second step of 3500 cycles is performed. After the second step, the cut is calculated the same way as in step one and total cut is obtained by adding initial cut and cut during the second step. Tables 4 and 5 below shows tested compositions for A1 and A2 abrasive particles.

Overlap Shear Adhesion (OLS) Test Method

For the substrates, two 1 inch×4 inch×0.064 inch (2.5 (centimeter) cm×10.2 cm×0.16 cm) aluminum (Al) coupons were abraded with SCOTCH-BRITE GENERAL PURPOSE HAND PAD #7447 (3M Company, St. Paul, Minnesota) before being cleaned with isopropanol and air-dried. At the tip of one coupon, a 0.5 inch by 0.5 inch (1.27 cm×1.27 cm) square was coated with a thin layer of the adhesive formulation and then contacted with another coupon in the opposite tip direction. Clips were used to hold the two halves together during the curing process. The approximate thickness of the material between the coupons was between 3-5 mils (0.075-0.13 millimeters (mm)) between coupons. The samples were then cured at 80° C. for 3 hours or overnight prior to overlap shear testing. The OLS crosshead speed was set to 0.1 inch/minute. A higher OLS results correlates to better adhesion performance. All results shown here are adhesive failures.

Compression Test Method

Compression tests were conducted in an Instron Universal Testing machine model 2511 using a 500 N load cell (Binghamton, New Jersey). Tests were conducted at a cross head speed of 10 mm/minute. Samples were compressed down to a 1 millimeter (mm) gap. The original anvil height was 4.8 mm. The anvil diameter ranged from 4.9 to 5.2 mm.

General Procedure for Making Abrasive Composites

Hard Make or Size and Soft Make or Size Compositions

The compositions were prepared by adding components to a 500 milliliter (mL) glass container and mixing after the addition of each ingredient using a tongue depressor. Resins were added first, followed by catalyst, adhesion promoter, and dispersant. Solvent and mineral were added last. Mixing continued until a homogeneous mixture was obtained. The resulting compositions are reported in Table 2, below.

TABLE 2

| COMPONENT | HARD MAKE OR SIZE, weight percent of total | SOFT MAKE OR SIZE, weight percent of total |
|---|---|---|
| C1 | 1.89 | 1.89 |
| AP1 | 1.89 | 1.89 |
| D1 | 1.86 | 1.86 |
| CB1 | 94.36 | 0.00 |
| CB2 | 0.00 | 94.36 |

Sheet Composite Abrasives or Flat Form Factors

Sheet composite abrasives or flat form factors were made by applying the soft or hard make onto the substrate of interest. To make more uniform constructions, a release liner or biaxially oriented polypropylene was used below the substrate. Table 3 reports examples for making such sheets.eb;normal In Construction 1, 52 grams per square meter (gsm) of soft make composition were coated as a make layer precursor using a brush over a 25 gsm polypropylene nonwoven. Polypropylene sheets (15 cm by 25 cm) were also used as backing Immediately after coating, 242 gsm of P180 BFRPL were uniformly dropped over the wet mix, then the semi-finished specimen was placed in an oven at 80° C. for thirty minutes to ensure full cure although the mixture is solid after 3-5 minutes. The samples were taken out of the oven and then coated with 173 gsm of hard size with a brush and placed again in an oven at 80° C. for another thirty minutes. Constructions 2-5 were prepared as in Construction 1, except using the amounts reported in Table 3, below.

TABLE 3

| | CONSTRUCTION | | | | |
|---|---|---|---|---|---|
| COMPONENT | 1 SOFT-HARD | 2 SOFT-SOFT | 3 HARD-HARD | 4 HARD-HARD | 5 HARD-HARD |
| MINERAL GRADE | A1 (P-180) | A1 (P-180) | A1 (P-180) | A2 (P-320) | A3 (P-180) |
| BACKING, gsm | 25 | 25 | 25 | 25 | 25 |
| MAKE WEIGHT, gsm | 52 | 54 | 88 | 54 | 105 |
| MINERAL WEIGHT, gsm | 242 | 254 | 404 | 134 | 484 |
| SIZE WEIGHT, gsm | 173 | 182 | 126 | 105 | 152 |

TABLE 4

| EXAMPLE | CON-STRUC-TION | BACKING TYPE | BACKING WEIGHT, gsm | MAKE TYPE | SIZE TYPE |
|---|---|---|---|---|---|
| EX-1 | 3 | PPNW | 25 gsm | hard | hard |
| EX-2 | NM | PPNW | 25 gsm | hard | hard |
| EX-3 | NM | CU | low weight | hard | hard |
| EX-4 | NM | PEU | low weight | hard | hard |
| EX-5 | 1 | PPNW | 25 gsm | soft | hard |
| EX-6 | 2 | PPNW | 25 gsm | soft | soft |
| EX-7 | NM | CC | J weight | soft | soft |
| EX-8 | NM | TPEF | low weight | soft | soft |
| EX-9 | NM | PPNW | 25 gsm | hard | hard |
| EX-10 | NM | FTCB | J weight | soft | hard |
| 3M Cloth Belt 302D, P180 grit size, available from 3M Company | | FTCB | J weight | phenolic | phenolic |

In Table 4, above, PPNW = Polypropylene non-woven; CU = Cotton untreated; PEU = Polyester untreated; CC = Cotton cloth; TPEF = Thin polyethylene film; FTCB = Fully treated cotton backing; Low weight = very low weight backing (e.g., less than 25 gsm); J weight = light and flexible common cotton backing. NM = Not measured.

TABLE 5

| EXAMPLE | INITIAL CUT, grams | FINAL CUT, grams | TOTAL CUT, grams | DISC WEIGHT INITIAL, grams | DISC WEIGHT FINAL, grams | DISC WEIGHT % loss | FIGURE OF MERIT: TOTAL CUT/% DISC WEIGHT LOSS |
|---|---|---|---|---|---|---|---|
| EX-1 | 0.212 | 0.573 | 0.785 | 6.057 | 6.047 | 0.17 | 4.75 |
| EX-2 | 0.202 | 0.589 | 0.791 | 6.206 | 6.197 | 0.15 | 5.45 |
| EX-3 | 0.291 | 0.802 | 1.093 | 6.995 | 6.958 | 0.53 | 2.07 |
| EX-4 | 0.289 | 0.769 | 1.058 | 6.618 | 6.596 | 0.33 | 3.18 |
| EX-5 | 0.341 | 0.765 | 1.106 | 5.175 | 5.176 | −0.02 | 57.24 |
| EX-6 | 0.211 | 0.312 | 0.523 | 5.355 | 5.352 | 0.06 | 9.34 |
| EX-7 | 0.147 | 0.142 | 0.289 | 7.446 | 7.435 | 0.15 | 1.96 |
| EX-8 | 0.087 | 0.06 | 0.147 | 5.543 | 5.523 | 0.36 | 0.41 |
| EX-9 | 0.101 | 0.082 | 0.183 | 4.59 | 4.587 | 0.07 | 2.80 |
| EX-10 | 0.085 | 0.13 | 0.215 | 14.968 | 14.945 | 0.15 | 1.40 |
| 3M Cloth Belt 302D, P180 grit size | 0.650 | 2.975 | 3.625 | 6.785 | 6.777 | 0.12 | 30.74 |

TABLE 3-continued

| | CONSTRUCTION | | | | |
|---|---|---|---|---|---|
| COMPONENT | 1 SOFT-HARD | 2 SOFT-SOFT | 3 HARD-HARD | 4 HARD-HARD | 5 HARD-HARD |
| 4-INCH (10.2 cm) DIAMETER DISC, grams | 5.2 | 5.4 | 5.2 | 3.8 | 6.2 |

Tables 4 and 5 report abrasive disc constructions and Schieffer cut test results for abrasive discs made with A1 (P-180 mineral grade) abrasive grains, respectively. Tables 6 and 7 report abrasive disc constructions and Schieffer Cut test results for abrasive discs made with A2 (P-320 mineral grade) abrasive grains, respectively. Not all example construction components were measured as in Table 3, however, the percentages make weight, mineral weight, and size weight used to make other constructions would be similar to those presented in Table 3.

TABLE 6

| EXAMPLE | CON-STRUC-TION | BACKING TYPE | WEIGHT, gsm | MAKE TYPE | SIZE TYPE |
|---|---|---|---|---|---|
| EX-11 | NM | CU | low weight | hard | hard |
| EX-12 | NM | PEU | low weight | hard | hard |
| EX-13 | NM | FTCB | J weight | hard | hard |
| EX-14 | NM | PPNW | 25 gsm | hard | hard |
| EX-15 | NM | PEU | low weight | hard | hard |
| EX-16 | 4 | PPNW | 25 gsm | hard | hard |
| EX-17 | NM | PPNW | 25 gsm | hard | hard |
| EX-18 | NM | FTCB | J weight | hard | hard |
| EX-19 | NM | CU | low weight | hard | hard |
| 3M Cloth Belt 332D, 320 grit size from 3M Company | | CC | X weight | phenolic | phenolic |

In Table 6, above,
PPNW = Polypropylene non-woven;
CU = Cotton untreated;
PEU = Polyester untreated;
CC = Cotton cloth;
FTCB = Fully treated cotton backing;
Low weight = very low weight backing (e.g., less than 25 gsm);
J weight = light and flexible common cotton backing;
X weight = heavy cloth backing;
NM = Not measured.

TABLE 7

| EXAMPLE | INITIAL CUT, grams | FINAL CUT, grams | TOTAL CUT, grams | DISC WEIGHT INITIAL, grams | DISC WEIGHT FINAL, grams | DISC WEIGHT % LOSS | FIGURE OF MERIT: TOTAL CUT/% DISC WEIGHT LOSS |
|---|---|---|---|---|---|---|---|
| EX-11 | 0.036 | 0.065 | 0.101 | 7.981 | 7.972 | 0.11 | 0.90 |
| EX-12 | 0.289 | 0.769 | 1.058 | 6.618 | 6.596 | 0.33 | 3.18 |
| EX-13 | 0.061 | 0.051 | 0.112 | 5.237 | 5.208 | 0.55 | 0.20 |
| EX-14 | 0.330 | 0.830 | 1.160 | 3.715 | 3.708 | 0.19 | 6.16 |
| EX-15 | 0.289 | 0.769 | 1.058 | 6.618 | 6.596 | 0.33 | 3.18 |
| EX-16 | 0.276 | 0.737 | 1.013 | 4.85 | 4.85 | 0.00 | Very high |
| EX-17 | 0.246 | 0.537 | 0.783 | 3.451 | 3.456 | −0.14 | Very high |
| EX-18 | 0.061 | 0.051 | 0.112 | 5.237 | 5.208 | 0.55 | 0.20 |
| EX-19 | 0.036 | 0.065 | 0.101 | 7.981 | 7.972 | 0.11 | 0.90 |
| 3M Cloth Belt 332D, 320 grit size | 0.453 | 1.152 | 1.605 | 6.788 | 6.769 | 0.28 | 5.73 |

TABLE 8

| EXAMPLE | CONSTRUCTION | BACKING TYPE | WEIGHT, gsm | MAKE TYPE | SIZE TYPE |
|---|---|---|---|---|---|
| E-20 | 5 | PPNW | 25 gsm | hard | hard |
| E-21 | NM | PPNW | 25 gsm | hard | hard |
| E-22 | NM | PPNW | 25 gsm | hard | hard |

In Table 8, above,
PPNW = Polypropylene non-woven;
NM = Not measured.

Adhesion Promoter Synthesis

Adhesion promoters were prepared as follows. The polymer diols were first dried under high vacuum at 100° C. for three hours. The appropriate amount of the dried diol was then mixed with the appropriate isocyanate, respectively (according to Table 9), in a glass vial that was then immediately sealed. The individual reaction mixtures were then magnetically stirred at 65° C. for 3 hours before being cooled to room temperature.

TABLE 9

| DESIGNATION | DIOL | DIOL AMOUNT, g | ISOCYANATE | ISOCYANATE AMOUNT, g |
|---|---|---|---|---|
| AP3 | PB2100 | 4.95 | MLQ | 5.05 |
| AP4 | PTHF2900 | 5.10 | MLQ | 4.90 |

TABLE 9-continued

| DESIGNATION | DIOL | DIOL AMOUNT, g | ISOCYANATE | ISOCYANATE AMOUNT, g |
|---|---|---|---|---|
| AP5 | PTHF1000 | 4.43 | MLQ | 5.57 |
| AP6 | PTHF650 | 4.00 | MLQ | 6.00 |
| AP7 | PPO2000 | 4.92 | MLQ | 5.08 |
| AP8 | PEO1450 | 4.72 | MLQ | 5.28 |
| AP9 | PC2000 | 4.92 | MLQ | 5.08 |
| AP10 | PC1000 | 4.43 | MLQ | 5.57 |
| AP11 | Polyester2000 | 4.92 | MLQ | 5.08 |
| AP12 | PTHF2900 | 5.1 | PolyMDI | 4.9 |
| AP13 | PTHF1000 | 1.76 | PolyMDI | 8.24 |
| AP14 | PTHF650 | 1.14 | PolyMDI | 8.86 |

Liquid Adhesive Formulations

Liquid adhesive formulations were prepared by weighing out the components according to Table into a speedmixer cup (FLACK ILK, Landrum, South Carolina). They were then speed mixed at 3500 rpm for 30 seconds. A typical formulation consists of 7.5 wt % TS-720, 1-6 wt % adhesion promoter (most typically 4.5 wt %), 1 wt % CT-762 with HPR 2128 as the remainder. Glass beads (3-5 mil (0.075-0.13 mm)) were added at a concentration of 0.2 mg glass beads/mL with respect to the final formulation to act as spacers.

TABLE 10

| ADHESION PROMOTER | ADHESION PROMOTER BACKBONE | ADHESION PROMOTER END GROUP | ADHESION PROMOTER AMOUNT, g | TS-720, g | C1, g | CB1, g | AVERAGE OLS, psi (kPa) |
|---|---|---|---|---|---|---|---|
| None | NA | NA | 0 | 0.75 | 0.1 | 8.7 | 389 (2682) |
| AP3 | PB2100 | MLQ | 0.45 | 0.75 | 0.1 | 8.7 | 3801 (26207) |
| AP4 | PTHF2900 | MLQ | 0.45 | 0.75 | 0.1 | 8.7 | 2897 (19974) |
| AP5 | PTHF1000 | MLQ | 0.45 | 0.75 | 0.1 | 8.7 | 915 (6309) |
| AP6 | PTHF650 | MLQ | 0.45 | 0.75 | 0.1 | 8.7 | 584 (4027) |
| AP7 | PPO2000 | MLQ | 0.45 | 0.75 | 0.1 | 8.7 | 826 (5695) |
| AP8 | PEO1450 | MLQ | 0.45 | 0.75 | 0.1 | 8.7 | 536 (3696) |
| AP9 | PC2000 | MLQ | 0.45 | 0.75 | 0.1 | 8.7 | 516 (3558) |
| AP10 | PC1000 | MLQ | 0.45 | 0.75 | 0.1 | 8.7 | 482 (3323) |
| AP11 | Polyester2000 | MLQ | 0.45 | 0.75 | 0.1 | 8.7 | 372 (2565) |
| AP12 | PTHF2900 | PolyMDI | 0.45 | 0.75 | 0.1 | 8.7 | 3316 (22863) |
| AP13 | PTHF1000 | PolyMDI | 0.45 | 0.75 | 0.1 | 8.7 | 2988 (20602) |
| AP14 | PTHF650 | PolyMDI | 0.45 | 0.75 | 0.1 | 8.7 | 1228 (8467) |

Abrasive Formulations

Abrasive formulations (Table 9) were prepared by weighing out the components into a Speedmixer cup (FLACK ILK, Landrum, SC), then speed mixing for 3000 revolutions per minute (rpm) for 20 seconds. The formulations were then loaded into a premade mold (molds were made using a 6 mm cork bore to punch holes into a 5 mm thick rubber sheet). The filled molds were then placed in a 100° C. oven for 20 minutes. The oven temperature was then raised to 120° C. and the abrasive formulations were cured for additional 40 minutes.

TABLE 10

| COMPOSITION | CONTROL (no adhesion promoter) | EX-101 | EX-102 | EX-103 | EX-104 |
|---|---|---|---|---|---|
| CB1, grams | 1.5 | 1.47 | 1.4 | 1.35 | 1.2 |
| AP2, grams | 0 | 0.03 | 0.1 | 0.15 | 0.3 |
| C2, grams | 0.025 | 0.025 | 0.025 | 0.025 | 0.025 |
| A4, grams | 8.5 | 8.5 | 8.5 | 8.5 | 8.5 |

TABLE 11

| | YIELD LOAD, pounds force (N) | STANDARD DEVIATION, pounds force (N) |
|---|---|---|
| CONTROL | 814 (3621) | 67 (298) |
| EX-23 | 1863 (8287) | 157 (698) |
| EX-24 | 1572 (6993) | 81 (360) |
| EX-25 | 1326 (5898) | 170 (756) |
| EX-26 | 1046 (4653) | 28 (125) |

All cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising at least one cyclic olefin capable of undergoing ring opening metathesis polymerization;

at least one ring opening metathesis polymerization catalyst or precursor catalyst thereof;

abrasive particles having surface hydroxyl groups; and a difunctional coupling agent represented by the structure

Z-X-Z wherein each Z independently represents a group that is chemically reactive with at least one of the surface hydroxyl groups of one of the abrasive particles thereby forming at least one covalent bond, wherein Z is —N═C═O, and wherein X represents a divalent organic linking group have a number average molecular weight of 500 to 10000 grams per mole.

2. The curable composition of claim 1, wherein X represents a divalent organic linking group have a number average molecular weight of 600 to 6000 grams per mole.

3. The curable composition of claim 1, wherein the at least one cyclic olefin comprises dicyclopentadiene, norbornene, ethylidenenorbornene, cyclopentene, cyclooctene, tricyclopentadiene, tetracyclopentadiene, norbornadiene, 7-oxobicyclo[2.2.1]hept-2-ene, tetracyclo[6.2.13.6.0]dodeca-4,9-diene, hexylnorbornylene, cyclopentadiene, alkyl norbornene, an oligomer thereof, or a combination thereof.

4. The curable composition of claim 1, wherein the at least one ring opening metathesis polymerization catalyst comprises at least one ruthenium, tungsten, osmium, or molybdenum ring opening metathesis polymerization catalyst.

5. The curable composition of claim 1, wherein the abrasive particles are sized according to an abrasives industry recognized specified nominal grade.

6. A curable composition comprising at least one cyclic olefin capable of undergoing ring opening metathesis polymerization;

at least one ring opening metathesis polymerization catalyst or precursor catalyst thereof;

abrasive particles having surface hydroxyl groups; and a difunctional coupling agent represented by the structure

Z-X-Z wherein each Z independently represents a group that is chemically reactive with at least one of the surface hydroxyl groups of one of the abrasive particles thereby forming at least one covalent bond, wherein X represents a divalent organic linking group have a number average molecular weight of 500 to 10000 grams per mole, and wherein the difunctional coupling agent comprises an isocyanate-terminated polyurethane prepolymer of 4,4'-diphenylmethane and a polyalkylene glycol.

7. A curable composition comprising at least one cyclic olefin capable of undergoing ring opening metathesis polymerization;

at least one ring opening metathesis polymerization catalyst or precursor catalyst thereof;

abrasive particles having surface hydroxyl groups; and a difunctional coupling agent represented by the structure

Z-X-Z wherein each Z independently represents a group that is chemically reactive with at least one of the surface hydroxyl groups of one of the abrasive particles thereby forming at least one covalent bond, wherein X represents a divalent organic linking group have a number average molecular weight of 500 to 10000 grams per mole, and wherein the difunctional coupling agent comprises a diphenylmethane diisocyanate-terminated polyether prepolymer based on polytetramethylene ether glycol.

8. The curable composition of claim 1, wherein X comprises a polyoxyalkylene segment.

9. The curable composition of claim 1, wherein X comprises at least one of a polyethylene oxide segment, a polypropylene oxide segment, or a polybutylene oxide segment.

10. The curable composition of claim 1, wherein X comprises a polybutadiene segment.

11. The curable composition of claim 1, wherein Z is —$SiR^6aL2$ (3-a), wherein L2 represents a hydrolyzable group, wherein R6 represents an alkyl group having from 1 to 4 carbon atoms, and wherein a is 0, 1, or 2.

12. The curable composition of claim 1, further comprising filler particles.

13. The curable composition of claim 1, further comprising grinding aid particles.

14. An abrasive article comprising abrasive particles and an at least partially cured reaction product of the curable composition of claim 1.

15. The abrasive article of claim 14, wherein the abrasive article comprises a bonded abrasive article.

16. The abrasive article of claim 14, wherein the abrasive article comprises a substrate having an abrasive layer disposed on a major surface thereof, wherein the abrasive layer comprises the at least partially cured reaction product.

17. The abrasive article of claim 16, wherein the substrate comprises a polymer film.

18. An abrasive article comprising:

a backing having opposed major surfaces;

a make layer disposed on one of the major surfaces of the backing, wherein the make layer comprises an at least partially cured reaction product of a curable composition comprising:

at least one cyclic olefin capable of undergoing ring opening metathesis polymerization;

at least one ring opening metathesis polymerization catalyst;

a difunctional coupling agent represented by the structure

Z-X-Z wherein each Z independently represents a group that is chemically reactive with at least one of the surface hydroxyl groups of one of the abrasive particles thereby forming at least one covalent bond, and wherein X represents a divalent organic linking group have a number average molecular weight of 1000 to 10000 grams per mole;

abrasive particles partially embedded in the make layer; and a size layer disposed over the make layer and abrasive particles.

19. The abrasive article of claim 18, further comprising a supersize layer disposed on the size layer.

* * * * *